United States Patent [19]

McClain, Jr. et al.

[11] 4,410,115
[45] Oct. 18, 1983

[54] TOY CARRIER DEVICE

[76] Inventors: John D. McClain, Jr., 300 W. Maple, Apt. #110; Bruno J. March, 409 S. Washington Blvd., both of Mundelein, Ill. 60060

[21] Appl. No.: 271,286

[22] Filed: Jun. 8, 1981

[51] Int. Cl.³ ............................................. B62J 11/00
[52] U.S. Cl. ....................................... 224/39; 224/42; 224/268; 224/269; 248/215; 248/305
[58] Field of Search ............ 280/202, 289 A; 224/36, 224/41, 35, 37, 30 A, 30 R, 42, 39, 40, 32 R, 42.46 R; 24/256, 257, 262, 3 D, 3 E, 3 J, 255 R; 248/215, 305, 316, 226.5, 225.3, 316 D; 403/373; 46/74 D; D8/373, 367

[56] References Cited

U.S. PATENT DOCUMENTS

| | | | |
|---|---|---|---|
| D. 162,336 | 3/1951 | Oest et al. | 17/3 |
| D. 248,367 | 7/1978 | Haft | D8/373 |
| D. 251,124 | 2/1979 | Takeuchi | D8/373 |
| 296,299 | 4/1884 | Swan . | |
| 324,294 | 8/1885 | Brothwell . | |
| 499,213 | 6/1893 | Cooper . | |
| 501,392 | 7/1893 | Wiedenmann . | |
| 578,128 | 3/1897 | Wentworth | 224/37 |
| 593,978 | 11/1897 | Boehm | 224/37 |
| 833,186 | 10/1906 | Walsh . | |
| 850,261 | 4/1907 | Smith | 24/3 J |
| 884,256 | 4/1908 | Addie . | |
| 1,459,582 | 6/1923 | Dubee | 24/257 R |
| 1,477,256 | 12/1923 | Fritz . | |
| 1,533,970 | 4/1925 | Campbell et al. | 24/256 X |
| 1,556,127 | 10/1925 | Pruett . | |
| 1,611,275 | 12/1926 | Lewis . | |
| 1,972,434 | 9/1934 | Yerk | 24/3 |
| 2,086,928 | 7/1937 | Tiryakian | 248/305 X |
| 2,136,855 | 11/1938 | Lancaster | 24/3 R |
| 2,426,479 | 8/1947 | Wohlhieter | 24/81 |
| 2,547,424 | 4/1951 | Williams | 24/72 |
| 2,628,861 | 2/1953 | Greig | 24/256 X |
| 2,711,637 | 6/1955 | Wells | 65/54 |
| 2,985,290 | 5/1961 | Locklin | 206/53 |
| 2,988,314 | 6/1961 | Urich | 248/214 |
| 3,136,551 | 6/1964 | Ruderian | 273/142 |
| 3,176,950 | 4/1965 | Hittesdorf | 224/42 X |
| 3,409,954 | 11/1968 | Schneider | 24/257 |
| 3,520,035 | 7/1970 | Clark | 24/255 |
| 3,639,952 | 2/1972 | Thompson et al. | 24/255 R |
| 3,661,693 | 5/1972 | Pierson | 24/255 R |
| 3,754,307 | 8/1973 | Froehlich, Jr. | 24/255 R |
| 3,766,613 | 10/1973 | Merfeld | 24/255 R |
| 3,773,288 | 11/1973 | Bolton | 248/225.3 |
| 3,848,783 | 11/1974 | Falk | 224/42 X |
| 4,041,931 | 8/1977 | Elliott et al. | 24/256 X |
| 4,062,482 | 12/1977 | Szalony | 224/5 |
| 4,090,733 | 5/1978 | Altschul | 24/255 R X |
| 4,279,396 | 7/1981 | Bendock | 248/316 D X |

FOREIGN PATENT DOCUMENTS 111621 7/1900 Fed. Rep. of Germany ........ 224/41

Primary Examiner—Allan N. Shoap
Assistant Examiner—Robert Petrik
Attorney, Agent, or Firm—Hill, Van Santen, Steadman & Simpson

[57] ABSTRACT

A carrier device for supporting from a generally horizontal elongate support such as bicycle bar or a belt a rim-flanged article such as a flying disc toy. The device comprises a one-piece resilient loop shaped body having a head loop portion for reception of the elongate support, and connecting downwardly extending first leg provided with a distal end first jaw and a downwardly extending spaced second leg terminating in a second jaw, the jaws cooperating to grip the flanged rim portion of the article and suspend the article from the second jaw.

6 Claims, 6 Drawing Figures

TOY CARRIER DEVICE

This invention relates to an article carrier device, and is more particularly concerned with such a device adapted for suspending a rim-flanged article such as a flying disk toy from an elongate support such as a bicycle bar or belt.

Heretofore, numerous and varied clip-type connecting and supporting devices have been proposed for connecting or supporting a large variety of different articles from various types of supporting structure. By way of example, a flower holder attachable to a bicycle handlebar is depicted in U.S. Pat. No. 501,392 of 1893. A safety watch support attachable to a user's belt is disclosed in U.S. Pat. No. 833,186 of 1906. However, insofar as we are presently advised, no satisfactory, simple, economical device has been heretofore provided for conveniently supportingly suspending a rim-flanged article such as a toy by its rim flange from an elongate support such as a bicycle bar or belt. For example, a popular rim-flanged toy is the generally saucer shaped hand thrown flying disk toy, presently available under the trademark "FRISBEE". While such a toy is light in weight, it is rather awkward to transport it by a bicycle rider or pedestrian. Often a person carrying such a flying disk toy may wish to employ his hands for other purposes so that the toy is an inconvenient burden.

It is, therefore, an important object of the present invention to provide a new and improved, simple, inexpensive, convenient rim-flanged article carrier device, and which device is especially suitable for transporting a flying disk toy.

In an embodiment of this invention, there is provided a carrier device adapted for supportingly suspending a rim-flanged article, e.g., a toy, by its flanged rim portion from a generally horizontal elongate support such as a bicycle bar or belt, and comprising a one-piece resilient loop shaped body having a head loop portion connecting a downwardly extending first leg provided with a distal end first jaw, and a downwardly extending spaced second leg terminating in a distal end second jaw projecting toward said first jaw and turned upwardly for cooperation with said first jaw for receiving between the jaws and retainingly gripping the article at the flanged rim portion and suspending the article by supporting its rim flange on said second jaw; said body being manipulatable for resiliently flexibly spreading said jaws and legs apart for reception of the elongate support within said head loop portion; and said body normally resiliently biasing said legs toward jaw-closing, article gripping relation.

Other objects, features and advantages of the present invention will be readily apparent from the following description of certain representative embodiments thereof, taken in conjunction with the accompanying drawing, although variations and modifications may be effected without departing from the spirit and scope of the novel concepts embodied in the disclosure, and in which.

Figure 1:
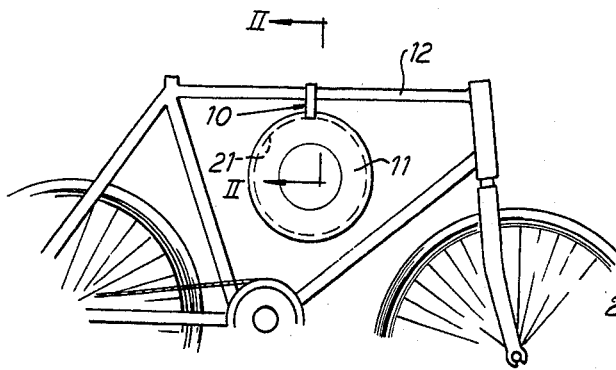
FIG. 1 is a fragmentary side elevational view of a bicycle showing an article carrier device embodying the invention supporting a flying disk toy.
Figure 2:
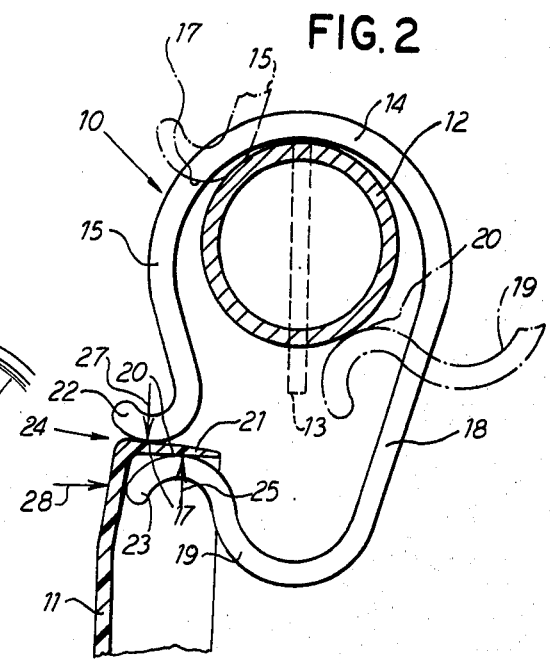
FIG. 2 is an enlarged fragmentary sectional elevational view taken substantially along the line II—II of FIG. 1.
Figure 3:
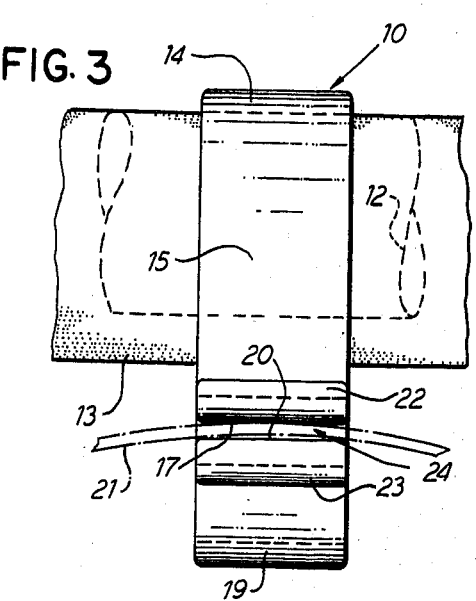
FIG. 3 is an elevational view looking toward the right in FIG. 2.

On reference to FIGS. 1 and 2, article carrier device 10 is depicted as supporting a flying disk toy 11 in suspended relation from an elongate support 12 which may comprise the upper frame bar of a bicycle, but which may, alternatively, be a bicycle handlebar, or as shown in dash outline in FIG. 2 and in full outline in FIG. 3, may be trouser belt 13 where it is desired to carry the flying disk 11 in that manner.

In a preferred construction, the device 10 comprises a one-piece resilient open-loop-shaped body having a head loop 14 connecting a downwardly extending first leg 15 provided with a distal end downwardly facing jaw 17 and a downwardly extending spaced second leg 18 longer than the first leg 15 and terminating in a loop-closing extension 19 provided with an upwardly facing jaw 20 closingly cooperative with the downwardly facing jaw 17 for receiving and retainingly gripping by and between the jaws, the rim flange, identified at 21, of the flying disk toy 11. The body of the device 10 is manipulatable for resiliently flexibly spreading the jaws 17 and 20 and the legs 15 and 18 apart, as shown in dash outline in FIG. 2, for reception of the elongate support 12 or 13 within the head loop portion 14. Normally, the body of the device 10 resiliently biases the legs 15 and 18 toward jaw-closing toy rim flange gripping relation. Resilient bias toward the jaws 17 and 20 is enhanced by having the head loop 14 of substantially semicylindrical shape of an inside loop dimension large enough for freely accommodating a general range of bicycle bar diameters. Further, the spaced legs 15 and 18, desirably extend from the respective opposite ends of the head loop 14 at respective convergent angles which if projected would meet at a point aligned with a vertical axis through the center of the head loop 14. In addition to enhancing the resilient gripping bias, this relationship of the legs taken together with their length contributes to an efficient suspension balance for the device 10.

A desirable construction provides the jaw 17 at the lower end of the downwardly and inwardly oblique leg 15 and on the underside of a return bent generally outwardly and upwardly curving distal end terminal lip flange 22. Similarly, and in complement to the lip flange 22, the lower jaw 20 is provided on an outwardly and downwardly curved distal end terminal flange 23 on the downwardly and inwardly oblique leg extension 19. Enhancement of the jaw gripping bias of the jaw 20 toward the jaw 17 is attained by an upwardly curved formation of the leg extension 19 toward the jaw 20 and wherein the major length of the extension 19 provides a larger undulation of a generally S-curve of which the lip flange 23 provides a shorter undulation, and the juncture of the S-curve undulations lies in generally oblique alignment with the oblique plane of the leg 15. Considered another way, the leg extension 19 provides an upwardly opening loop hook along the bottom of the device 10 terminating in the jaw lip flange 23. It will be observed that the generally divergently related terminals of the lip flanges 22 and 23 provide therebetween a convenient lead-in flaring mouth 24 to facilitate reception of the rim flange 21 by relatively maneuvering the rim flange and the device 10 toward one another. Normally, the jaws 17 and 20 will be biased substantially closer together than the thickness of the rim flange 21 so that as the flange 21 is forced between the jaws, the jaws will spread apart resiliently and effect a firm grip on the interposed rim flange 21.

Thorough gripping retaining suspended engagement of the toy 11 is assured not only by the simple clamping gripping engagement of the rim flange 21 by and between the jaws 17 and 20, but also by virtue of the normally inwardly divergent slant of the inner surface of the rim flange 21 normally found on the flying disk toys, and which surface is engaged in a generally interhooked relation by the upwardly curved jaw 20. In addition, by having the curved upper jaw 16 in an outwardly offset relation to the lower jaw 20, there is a desirable combination of retaining forces applied to the article 11 and its rim flange 21, as indicated by force arrows comprising an arrow 25 showing upward component of thrust by the jaw 20 on the inner surface of the rim flange 21, and outwardly offset downwardly directed force arrow 27 indicating the downward thrust of the jaw 17 offset relative to the upward thrust 25 of the jaw 20, and a thrust vector arrow 28 indicating how the combination of offset upward and outward thrust vectors 25 and 27 on the rim flange 21 tend to swing the article 11 inwardly toward engagement with the lip flange 23. This effects a firm three point grip of the article 11 which retains the article against swinging relative to the carrier device 10, although the carrier device with the suspended article 11 is adapted to swing freely relative to the bar 12. Because of the neatly curved form of the jaws 17 and 20, not only is mounting of the article 11 on the carrier 10 facilitated, but when it is desired to disengage the article from the carrier, that can be readily effected by appropriate manipulation.

Figure 4:
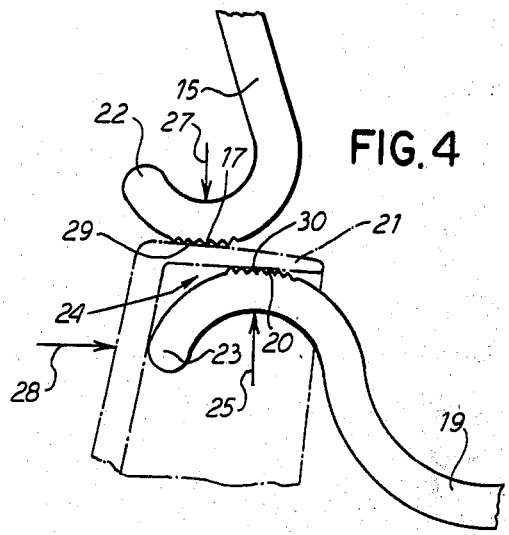
FIG. 4 is a substantially enlarged fragmentary side elevational view of the carrier device showing a slight modification in the jaw structure.

If desired, as shown in FIG. 4, the surfaces of the jaws 17 and 20 may be provided with respective shallow closely spaced ridged gripper teeth 29 and 30. These teeth should be just enough to afford a gripping tread roughness of the jaw surfaces, but free from toy rim flange damaging abrasiveness.

To enable a person to carry the article 11 comfortably by suspension from the belt 13, the longer leg 18 of the device 10 may be substantially straight and flat throughout the width of the device, the outside flat surface of the leg 18 bearing against the belt supported garment below the belt.

Figure 6:
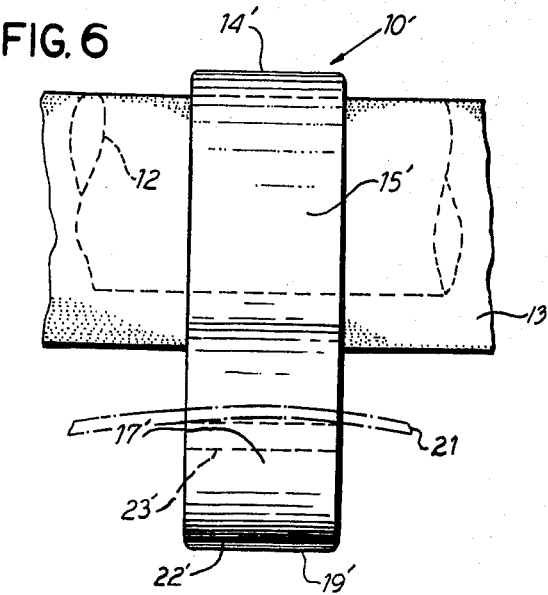
FIG. 6 is an elevational view looking toward the right in FIG. 5.
Figure 5:
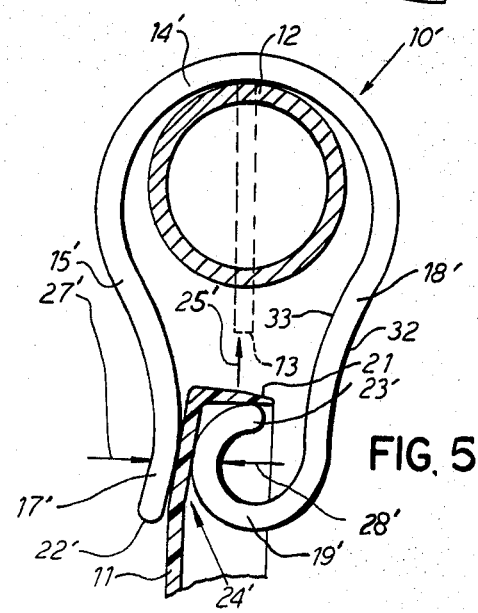
FIG. 5 is a sectional elevational view similar to FIG. 2, but showing a modified form of the carrier device.

Another preferred form of the invention, as shown in FIGS. 5 and 6, comprises an article carrier device 10' for supporting the flying disk toy 11 in suspended relation similarly as the device 10 of FIGS. 1-3, but with a modification in the gripping jaw structure which for some purposes may be preferred as providing a more positive support for the article. To this end, one piece resilient loop shaped body of the device has head loop 14' of ample semicylindrical dimension to receive bicycle bar 12 or belt 13 freely therein. A downwardly extending elongate first leg 15' and a downwardly extending spaced elongate second leg 18' are connected by the head loop 14' and the legs 15' and 18' converge generally toward one another and provide the device with a vertically elongate form. At its terminal end portion, the leg 15' has a first jaw 17' which comprises a downwardly extending leg terminal joining the remainder of the leg 15' on preferably a slight curve so that jaw 17' extends more nearly vertically.

On its distal end portion, the leg 18' has an outwardly projecting and upwardly opening lower jaw loop 19' terminating in an upwardly and inwardly curled terminal second jaw 20' which shoulders toward the first jaw 17' and has an upwardly facing jaw lip flange 23'. In this construction, the legs 15' and 18' with the aid of the loop 14' resiliently bias the jaws 17' and 20' toward one another so that the jaws will cooperate for receiving therebetween and retainingly gripping the article 11 at the flange rim portion below the rim 21 of the article, which is suspendingly supported on the lip flange 23' of the second jaw 20'. Thus, the jaws 17' and 20' together effect 3-point gripping engagement with the article rim flange portion, as shown by directional arrow 25' indicating the suspension support of the article rim flange 21 provided by the terminal lip flange 23', the arrow 27' indicating engagement by the first jaw 17' with the rim flange portion or perimeter area of the article, and the arrow 28' indicating engagement of the jaw 20' with the rim flange marginal area portion of the article 11, in gripping clamping cooperation with the jaw 17'.

Convenient lead-in flaring mouth 24' is defined by portions of the jaw 17' and the loop 19' for facilitating reception of the flange rim portion of the article between the jaws by resiliently spreading the distal end portions of the legs apart for this purpose. At its tip the terminal end of the jaw 17' is desirably rounded for lead-in facility in cooperation with the curved surface where the lower loop 19' and the jaw 20' join.

Instead of a substantially straight elongate formation as in the leg 18 of FIG. 2, the leg 18' may be formed on a longitudinal curvature providing a concave outer surface 32 and a convex inner surface 33 joining the head loop 14' and the bottom loop 19' on smoothly ogee curvature junctures. This tends to stiffen the resilient bias of the leg 18'. Further, this accommodates within the concave surface 32 any waistband projection in the associated garment where the device is supported on the belt 13.

Typically, the carrier device 10 or 10' may be about 2⅛" in length and about ¾" wide and formed from a suitable plastic material such as polypropylene. The radius within the head loop 14 may be about 0.625", and the radius within the loop of the bottom closure extension 19 in FIG. 2 may be about 0.312". A substantially uniform thickness of about 0.125" in the continuous one-piece body material has been found satisfactory. The device 10, 10' as constructed, provides a convenient, efficient, low cost small size unit which can be readily and comfortably carried in a garment pocket when not in use or can be left in place on the elongate support such as bicycle bar or belt without interference with normal use or activity in respect to the elongate support.

The mouth 24, 24' of the device facilitates insertion as well as removal of the flanged rim portion of the article 11 in respect to the grippingly clamped and suspended position between the jaws 17, 17' and 20, 20'. A thoroughly stabilized suspended support of the article 11 is attained by the gripping coaction of the jaws 17, 17' and 20, 20' accompanied by the suspending support provided by the jaws 20, 20' under the rim flange 21 of the article.

It will be understood that variations and modifications may be effected without departing from the spirit and scope of the novel concepts of this invention.

We claim as our invention:

1. The combination of a generally saucer-shaped flying disk toy having a flanged rim portion including an axially extending annular rim flange with a radially inner face and a radially outer face, and a carrier adapted for supportingly suspending the toy from a generally horizontally elongate support, and wherein:

said carrier comprises a one-piece plastic member having a resilient loop-shaped relatively narrow body for freely receiving and engaging said support, said body defining a head loop portion having a contacting portion means for resting above said support with remaining portions of said head loop portion being spaced from said support;

said body merging with a pair of space depending legs extending downwardly from said head loop portion;

one of said legs being substantially shorter than the other of said legs and terminating in a downwardly and outwardly curved jaw so as to define a downwardly facing jaw surface;

said other of said legs having its lower end portion in the form of a generally looped-closing extension terminating in a generally upwardly projecting outwardly and downwardly curved jaw so as to define an upwardly facing jaw surface;

said body and legs resiliently biasing said jaws into contiguity but permitting said jaws and legs to be flexibly spread apart for receiving said support within the head loop portion of the carrier;

flaringly related lips on said jaw surfaces cooperating for defining an entry mouth through which said toy rim flange is adapted to be forced into gripped engagement by and between said jaw surfaces and with the lip of said other leg jaw surface suspending said toy by engaging said radially inner face of said toy rim flange; and said one leg jaw surface engaging said radially outer face of said toy rim flange in an outwardly offset relation to the engagement of the other leg jaw surface with the radially inner face of said toy rim flange so that a thrust vector is generated tending to swing the toy inwardly toward and into engagement with the lip of said other leg jaw, and the jaw surfaces thereby effecting a firm 3-point grip of the toy in supported relation on the carrier.

2. A combination according to claim 1, wherein said jaws have respective shallow closely spaced, ridged gripper teeth affording a gripping tread roughness to the rim flange engaging jaw surfaces, but free from rim flange damaging abrasiveness.

3. The combination of a generally saucer-shaped flying disk toy having a flanged rim portion including an axially extending annular rim flange with a radially inner face and a radially outer face and a carrier adapted for supportingly suspending the toy from a generally horizontally elongate support, and wherein:

said carrier comprises a one-piece resilient loop-shaped body providing a head loop of ample semicircular dimension to receive said support freely therein;

a downwardly extending elongate first leg and a downwardly extending spaced elongate second leg and said legs integrally connected by the head loop;

said legs converging generally toward one another and providing the carrier with a vertically elongate downwardly extending form;

a first jaw on the terminal end portion of said first leg and comprising a downwardly extending slightly curved jaw formation;

a downwardly extending second jaw terminal loop on said second leg curled upwardly and inwardly and shouldering toward said first jaw;

said second jaw suspendingly engaging said radially inner face of said toy rim flange and also engaging said toy adjacently below said rim flange;

said first jaw thrusting the engaged portion of said toy firmly toward said second jaw, so that the two jaws together effect a 3-point gripping engagement with the toy; and said jaws defining entry mouth surfaces for facilitating reception of the rim flange of the toy between the jaws by resiliently spreading the legs and thereby the jaws apart for this purpose.

4. A combination according to claim 3, wherein said head loop portion is substantially semicylindrical about a horizontal axis, and said second leg is bowed inwardly between juncture with said head loop portion and said second jaw.

5. A combination according to claim 3, wherein said second leg has means for stiffening the resilient bias of said second leg.

6. A combination according to claim 5, wherein said means for stiffening the resilient bias of said second leg comprises a longitudinal curvature of said second leg providing a concave outer surface and a convex inner surface joining the head loop portion and said second jaw on smoothly ogee curvature junctures.

* * * * *